United States Patent [19]

Weiner et al.

[11] 4,402,275

[45] Sep. 6, 1983

[54] PROCESS FOR THE CONTINUOUS BLOWING OF FINE-PARTICLED REDUCING AGENTS CONSISTING PREDOMINANTLY OF MINERAL COAL INTO A SHAFT FURNACE

[75] Inventors: Antoine Weiner; Fernand Artois, both of Luxembourg; Raymond Limpach, Huncherange, all of Luxembourg

[73] Assignee: Arbed S.A., Luxembourg, mbourg

[21] Appl. No.: 298,726

[22] Filed: Sep. 2, 1981

[30] Foreign Application Priority Data

Sep. 4, 1980 [LU] Luxembourg ............................ 82750
Oct. 2, 1980 [LU] Luxembourg ............................ 82821

[51] Int. Cl.³ .............................................. F23D 1/00
[52] U.S. Cl. ..................................... 110/347; 44/1 D; 110/218; 110/342; 110/346
[58] Field of Search .............. 110/347, 218, 342, 346, 110/196, 263; 44/27, 1 D, 1 E, 1 G

[56] References Cited

U.S. PATENT DOCUMENTS 3,864,094 2/1975 Locketz ............................ 44/1 G
4,043,763 8/1977 Norman et al. ................. 44/1 G
4,152,119 5/1979 Schulz ............................... 44/1 D
4,259,911 4/1981 Jones ................................ 110/263
4,324,562 4/1982 Schoppe ........................... 44/1 G

FOREIGN PATENT DOCUMENTS 2069668 8/1981 United Kingdom ................ 44/1 D

Primary Examiner—Edward G. Favors
Attorney, Agent, or Firm—Karl F. Ross; Herbert Dubno

[57] ABSTRACT

A mixture of fine-particle mineral coal and a fine-particle solid carrier of carbon is stored in a bulk store from which the mixture is withdrawn and continuously blown into a shaft furnace, e.g. a blast furnace. Sufficient carbon carrier is used to loosen the mixture and to prevent it from caking and sticking. A suitable carbon carrier is particulate compost obtained by rotting household refuse or sewage sludge.

9 Claims, No Drawings

PROCESS FOR THE CONTINUOUS BLOWING OF FINE-PARTICLED REDUCING AGENTS CONSISTING PREDOMINANTLY OF MINERAL COAL INTO A SHAFT FURNACE

FIELD OF THE INVENTION

The present invention relates to a process for the continuous blowing of fine-particle reducing agents, especially mineral coal (hard coal), into a shaft furnace, in particular a blast furnace.

BACKGROUND OF THE INVENTION

Although it is known that the coke consumption of a blast furnace can be reduced by the use of inexpensive fuels or by the direct introduction of reducing agents into the blast furnace, the blowing of coal into the blast furnace has hitherto been adopted in practice only to a restricted extent. This is due essentially to the fact that the conveyance and distribution of fine-particle coal from a storage container into the inlet openings of the blast furnace, which are generally the usual tuyeres provided anyhow, are accompanied by greater problems than with a fluid medium, for example oil or gas. Thus an incomplete reaction with solid fuels can lead to noticeable disturbances in the operation of the blast furnace, for example owing to the formation of soot which reduces the permeability of the charge toward the reducing gas and is sometimes also present in the top gas. The latter can lead to disturbances in the devices traversed by the top gas.

If inexpensive mineral coal is used in order to achieve the desired savings, a new problem arises. In fact, inexpensive mineral coals have high ash contents which can vary between 15 and 25%, the ash being markedly acidic. When using mineral coals of this type, there is a danger of the massive quantities of acidic ash not moving fast enough into the blast furnace slag and of the resulting inhomogeneous oxide mixtures flowing poorly and disturbing operation of the blast furnace.

It has also been found through practice and experience that, when adopting the technology of coal dust blasting, problems arise as in early as the storage containers. The mineral coal dust can have an average particle size below 100 microns, and exhibit the undesirable property of caking in the storage bunker. Attempts have been made to overcome the last-mentioned problem, among others by fitting mechanical all-round conveyors in the individual storage bunkers and continuously revolving the coal dust. Although this method substantially prevents caking and sticking, the conveyors needed represent a considerable cost factor and obviously have to operate absolutely reliably.

OBJECT OF THE INVENTION

It is the object of the invention, therefore, to provide a process which permits the use of inexpensive and fine-particle mineral coals, reduces the problems occurring during the storage in storage bunkers of fine mineral coals having a high ash content at least to a tolerable level, and completely avoids the need to fall back on expensive mechanical aids.

DESCRIPTION OF THE INVENTION

The present invention provides a process in which, prior to storage, the coal dust is mixed with a quantity (sufficient to loosen the dust) of a solid carrier of carbon, having an average particle size which preferably corresponds to that of the coal dust, and the bulk density of the carbon carrier can be clearly lower than that of the coal dust.

In other words, to prevent caking and sticking of the mineral coal dust, loosening agents are added thereto. These loosening agents should as far as possible have specific physical and chemical properties, for example, for introduction into a blast furnace.

More specifically, the solid carbon carriers should preferably be of a basicity such that the degree of basicity of the total ash which is formed in the blast furnace from the mineral coal and the carbon carrier lies as close as possible to the degree of basicity of the blast furnace slag.

Significant physical properties of the carbon carrier are, in particular, the particle size and the bulk density. They are selected in such a way that the resultant dust mixture can be conveyed and blown in without difficulty.

Lignite (brown coal) is an example of such a solid carbon carrier. A typical lignite has an ash content of 4–5%, of which about 60% consists of (CaO+MgO).

Another possible carbon carrier is peat or peat coke, both of which have a loosening effect and contain the basic ashes. The ash content of a typical peat is from 1 to 2% and that of a typical peat coke from 4 to 5%.

Sawdust can also be used advantageously as a loosening carbon carrier.

A particularly desirable embodiment of the process according to the invention involves the addition of compost obtained by the rotting of household refuse, and optionally of sludge from purification plant, as carbon carrier to the fine-particled mineral coal in order to loosen up the content of the storage bunker. These are products which are markedly basic. Household refuse compost has a pH value of 7 to 8. In some places the pH value can rise to 8.5.

Owing to the fact that about 330 kg of household refuse are produced per year per inhabitant in developed countries, than about 70% of this household refuse can be processed into compost by aerobic processes, and that fresh compost contains about 25% of carbon, the conclusion is reached that refuse and sewage sludge are substances which should not be deposited on slag heaps or burnt by energy-consuming expensive processes, but which should be converted into compost and used according to the invention for the industrial exploitation of their carbon content.

The conversion of household refuse and/or sewage sludge into compost by aerobic processes is given a new impetus by the process according to the invention as an alternative to processes resulting in the mere elimination of these valuable substances.

The use of mineral coal with compost promotes virtually complete conversion within the blast furnace in the short time available for it under virtually all operating conditions adopted. In addition, the supply of these mixtures to the blast furnace presents no problems.

The fact that the comminution of freshly prepared compost to the necessary degree of fineness incurs virtually no costs is also particularly desirable. The possibility of leaving a water content of up to 15%, preferably up to 10% in the mixture also makes the process economical, since the expenses for drying are insignificant. In fact, the water content, particularly due to the colloidal bonding thereof, can cause the water to evaporate explosively as it enters the blast furnace owing to the high temperature of about 1,100° to 1,650° C. suddenly occurring and, together with the volatile constituents also expelled explosively, causes small coal particles to burst so that the specific surface area is increased with the result that the reaction in the blast furnace takes place even more quickly. Moreover, the water content is so low that the heat requirement of the blast furnace is not be increased significantly.

More than one of the above-described carbon carriers may be used simultaneously.

SPECIFIC EXAMPLE

The carrier gas entering the blast furnace with the mixture, for example cold air, can form less than 3%, optionally about 1%, of the total hot blast blown through the tuyeres. This quantity is too small to influence the heat balance of the blast furnace significantly. If possible, the speed at which the dust particles issue from the feed pipe into the blast furnace should be lower than 50 m/s, preferably lower than 25 m/s. It may be possible, without further ado, to lower the blow-in speed to the back-fire speed, which will be of the order of 10 to 13 m/s. Such a low blow-in speed, which is substantially slower than the speed of about 120 to 220 m/s at which the hot blast normally having a temperature of about 1,1000° C. is blown through the tuyeres, prolongs the residence time of the dust particles in the zone which is located in front of each tuyere and is more or less empty. The process according to the invention permits the blowing in of relatively large quantities of carbon and therefore a noteworthy reduction in the coke consumption or complete replacement of the heavy oil predominantly used hitherto. This is due to the fact, already mentioned, that difficulties are present or arise neither during conveyance into the blast furnace nor during the reaction inside the blast furnace. The extent to which coke can be replaced by another cheaper auxiliary fuel is therefore always greater than with known processes for blowing coal as an auxiliary fuel into the hearth of a blast furnace.

We claim:

1. In a metallurgical process in which fine-particle mineral coal is continuously blown into a shaft furnace, the improvement which comprises the steps of:
    mixing the fine-particle mineral coal with at least one fine-particle solid carrier of carbon in the form of alkaline compost made by rotting household waste sewage sludge or a combination thereof;
    storing the resulting mixture in a bulk store, the quantity of the said carbon carrier being sufficient to loosen the said mixture and to prevent it from caking and sticking in the bulk store:
    withdrawing the mixture from the store; and
    blowing the mixture continuously into the shaft furnace.

2. The improvement defined in claim 1, further comprising the step of forming said compost such that the average particle size of the said carbon carrier is substantially equal to that of the coal.

3. The improvement defined in claim 1 or claim 2, further comprising the step of forming said compost such that the bulk density of the said carbon carrier is lower than that of the coal.

4. The improvement defined in claim 1, further comprising the step of adding lignite to said compost to form said carbon carrier.

5. The improvement defined in claim 1, further comprising the step of adding peat to said compost to form said carbon carrier.

6. The improvement defined in claim 1, further comprising the step of adding peat coke to said compost to form said carbon carrier.

7. The improvement defined in claim 1, further comprising the step of adding sawdust to said compost to form said carbon carrier.

8. The process defined in claim 1, in which the compost is obtained by aerobic rotting.

9. The process defined in claim 1, in which the compost is used as unmatured fresh compost.

* * * * *